United States Patent [19]

Bourguignon et al.

[11] 4,107,378
[45] Aug. 15, 1978

[54] METHOD AND APPARATUS FOR MANUFACTURING LINING PLATES AND PRODUCTS THEREOF

[75] Inventors: Guy Clément Bourguignon, Saint Amand Les Eaux; Joseph André Maquet, Lecelles, both of France

[73] Assignee: S.A. dite "Manufacture Francaise de Carrelages", Amand Les Eaux, France

[21] Appl. No.: 712,763

[22] Filed: Aug. 9, 1976

[30] Foreign Application Priority Data

Aug. 27, 1975 [FR] France ................. 75 26950

[51] Int. Cl.² .................................................. B28B 1/16
[52] U.S. Cl. ........................... 428/323; 52/395; 264/70; 264/113; 264/118; 264/122; 264/145; 264/162; 264/256
[58] Field of Search .............. 264/70, 112, 118, 122, 264/145, 162, 113, 256; 52/315, 390; 428/323

[56] References Cited

U.S. PATENT DOCUMENTS 3,097,080  7/1963  Weir ........................... 264/162 X
3,324,213  6/1967  Anfinset .................... 264/162 X

*Primary Examiner*—Thomas P. Pavelko
*Attorney, Agent, or Firm*—Martin A. Farber

[57] ABSTRACT

A method of manufacturing covering plates, particularly thin, flat and rigid plates, employing hard materials which are previously granulated or reduced to powder, agglomerated with the aid of synthetic resins, comprising the steps of:
 (a) depositing on a conveyor belt a layer of binding agent, containing hard purverulent matter and dyes,
 (b) depositing cleaned granules on the layer of binding agent,
 (c) depositing base granules on the preceding layer,
 (d) pressing vibro-compressor rollers on the strip thus formed,
 (e) passing the strip into a polymerization furnace,
 (f) removing the excess granules by suction,
 (g) stripping the strip from the belt and effecting the finishing and checking operations.

8 Claims, 6 Drawing Figures

METHOD AND APPARATUS FOR MANUFACTURING LINING PLATES AND PRODUCTS THEREOF

The present invention relates to a method of manufacturing lining or covering plates based on hard materials which are previously granulated or reduced to powder, and agglomerated with the aid of synthetic resins. It also relates to apparatus for applying said method.

A certain number of methods are known which enable, plates to be made which comprise synthetic resins and stone, marble, granite or any other hard material previously granulated or reduced to powder.

By these methods, plates of variable dimensions are obtained, whose thickness is also variable, of the order of 10 to 40 mm, and which are resistant to wear and tear, have decorative appearance, imitating natural stone, marble or other material and are able to be applied to surfaces which are to be coated.

However, up to the present time, such plates, which are thin, rigid and flat at the same time have not been able to be produced on an industrial scale.

In fact, synthetic resins, and particularly polyester resins, during polymerization are known to be the seat of high shrinkage stresses. These stresses, which are difficult to control have heretofore discouraged researchers who are desirous to combine rigidity and flatness of thin plates.

The problem to be solved therefore consists in finding a method of manufacture such that the plates, after their polymerization, dimensioning and finishing, remain flat and are therefore not the seat of internal torques causing strain.

To this end, the present invention relates to a method of manufacturing such plates and the interest represented thereby for solving problems of covering floor or wall surfaces is readily appreciated.

The studies and tests carried out by the inventors have shown that this result could be achieved only:

(1) if the quantity of resin used in the composition of the binding agent were reduced to a strict minimum;

(2) if the hardened and finished material had a strictly identical internal structure throughout;

(3) if the material presents on the surface a structure identical to that which would be observed on any imaginary flat surface passing in any manner through the mass of the material.

These conditions could theoretically be fulfilled by filling a mould — for example a test tube or a large cylindrical glass — with granules previously graded to different sizes and mixed in such proportions that the spaces between particles are filled with smaller particles, and so on, until the spaces between particles represent an overall minimum value, in other words, until a mixture is obtained of maximum apparent density throughout. This being so, the remaining spaces could, theoretically, be filled with fine dust, and finally by the binding agent, i.e. by the resin of which the quantity introduced for binding the whole would be both minimum and uniformly distributed in the mass.

If the skin effect which is produced on contact with the walls of the tube (or of the glass) on the internal surface of which there is formed a thin film of resin is not taken into account, it may be considered that the internal stresses of the hardened rod after polymerization would have no effect on the linearity of the rod released from its glass envelope.

It is clear that such a mixture cannot be made without a considerable dragging along and its strong consistency does not facilitate mixing. Resin could be added, but in this case:

(1) the causes of internal stresses are increased;

(2) the excess resin will disperse unequally in the mass; in particular, it will come to the surface and thus destroy the desired identity of the structure;

(3) the granules and particles being deposited irregularly, according to their size and density, will cause a disorderly sedimentation and consequently a heterogeneous structure;

(4) it will be noticed that, despite everything, air will be taken along by the blades of the mixer, and it remains imprisoned in the mass, in the form of bubbles and microbubbles which disturb the regularity of the structure and in addition reduce the mechanical and aesthetic qualities of the material.

These four factors or, more exactly, each of these four factors, would suffice to prevent the elimination of the internal stresses and would introduce the formation of torques, rendering the flatness or the plates produced under these conditions very problematic.

It is precisely an object of the invention to employ a technique and equipment which enable these factors or strain to be considerably reduced, if not completely eliminated.

Starting from the principle that the binding agent must not be mixed with the aggregates, in order to avoid admission of air and in order not to be forced to use an excessive quantity of resin, it has been sought to introduce the granules into the binding agent in another manner.

The method according to the present invention is characterized by the combination or the following successive operations:

(a) there is deposited on a conveyor belt, which has been previously coated with a stripping agent, a fine layer, or very uniform thickness, of binding agent based on an accelerated, catalyzed synthetic resin, containing hard pulverulent matter, dyes and possibly additives, this layer thus constituted being deposited regularly and in a graded manner by a binding agent distributor;

(b) a layer of binding agent of washed granules, graded from 1.5 mm to 10 mm, dried and mixed in favorable proportions, is sprinkled with the aid of a dispenser-distributor, the preceding operations being conducted by controlling the speed of the belt, the thickness of the film of the binding agent, its fluidity, and the quantity or granules introduced into the binding agent, so as to obtain an aggregate binding agent weight ratio which is as high as possible;

(c) the following section of the belt is subjected to vibration determining a sedimentation of the granules until the level of the binder rises above these granules;

(d) the preceding layer is covered with a base layer of granules which adhere on the surface of the strip;

(e) vibro-compressor rollers are applied on the strip;

(f) the strip is passed into a polymerization furnace;

(g) the excess granules are recovered by suction from the base layer;

(h) the strip is "stripped", i.e., removed from the belt;

(i) the strip is guillotined and cut into plates of large dimensions.

(j) the faces or the plates are polished on a grindstone (coarse polishing);

(k) the plates which are obtained are finished (fine polishing);

(l) the plates are sawn to the desired dimensions;

(m) the plates are passed into an end-of-polymerization or annealing furnace,

The invention will be more readily understood on reading the following description with reference to the accompanying drawings, in which.

Figure 6:
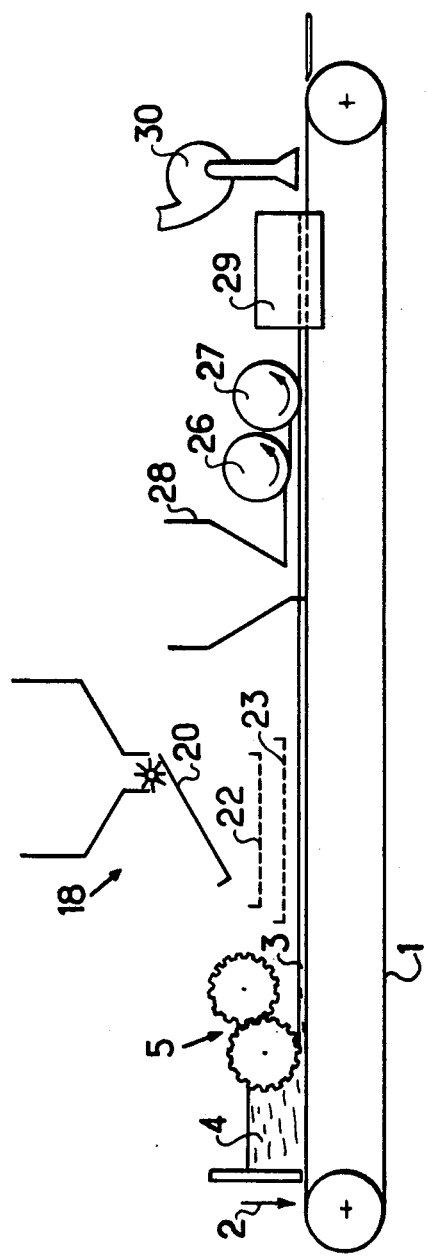
FIG. 6 is a schematic view of the apparatus as a whole.

Referring now to the drawings, an endless conveyor belt 1 with edging used in the apparatus according to the invention is made of steel, of variable speed and sufficient length (about 20 meters) for all the subsequent operations to be carried out in the time taken for a length of belt to move. The belt is previously coated with a stripping agent as indicated at arrow 2 (FIG. 6).

In a first stage, a fine layer 3 of very uniform thickness of binding agent based on accelerated, catalysed, synthetic resin containing hard pulverulent matter, dyes and possibly special additives, is deposited (by means of equipment described hereinafter) on the continuously moving conveyor belt (moving, for example at 2 meters a minute).

The binding agent is prepared in two distinct parts, which will be combined only at the moment when the binding agent is used. The first part is prepared in a rotary cylinder (not shown) in which there are introduced all or part of the resin, the pulverulent fillers, the catalyst(s), the dye(s), etc., all in suitably selected quantities which may vary considerably according to the manufacture and techniques of polymerization adopted (which do not form part of the invention and are therefore not described). However, it should be indicated that in this first part of the binding agent, and in view of the fact that the latter will be deposited on the belt 1 at a well determined temperature, it will be sought to introduce into the resin a maximum proportion of pulverulent fillers (of the order of 200% of the weight of the resin), the granulometry of the dust ranging from 10 microns to 300 microns. This is possible only if the subsequently introduced granules are wetted.

Of course, it would be advantageous to increase the rate of the fillers somewhat, but the binding agent would lose the fluidity required for the subsequent operations; it seems that the temperature of the binding agent could be slightly increased to increase its fluidity, but in that case there would exist the risk of having to give the gel and polymerization times, values incompatible with the running of the operations.

This first part of the binding agent thus obtained is brought in small quantities, which vary as a function of the requirements of a binding agent distributor (described hereinafter) towards a small mixer-disperser in which there is introduced in controlled quantity the second part of the binding agent, composed either of accelerated resin or simply of the accelerator(s).

At the outlet of the disperser, the binding agent is ready and arrives in a tank 4 located upstream of a binding agent distributor 5. Downstream of this apparatus, the binding agent remaining on the belt has been controlled in quantity and calibrated in thickness. The binding agent distributor 5 forms part of the invention and is described hereinafter with reference to FIGS. 1 and 2.

On a shaft 6 fixed perpendicularly to the movement to the belt 1, a few centimeters above this there are threaded gears 7, 8, 9, 10, 11, 12, 13, placed side by side and positioned so that the assembly of the gears forms a toothed cylinder, the length of which is equal to the width of the belt. Discs 14, 15 of small thickness are interdisposed at each end and at uniform intervals.

Figure 1:
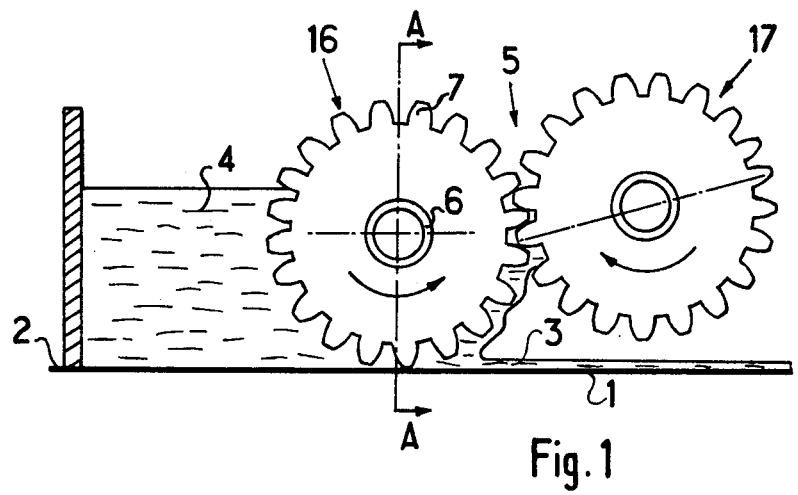
FIG. 1 is a detailed schematic view in section of the binding agent distributor.
Figure 2:
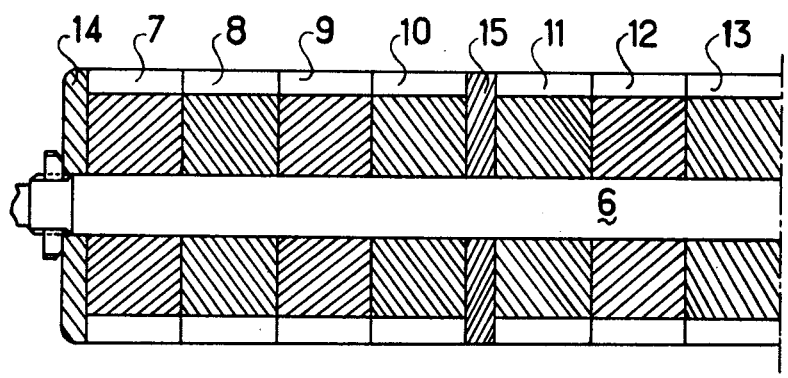
FIG. 2 is a section along AA of FIG. 1.
Figure 5:
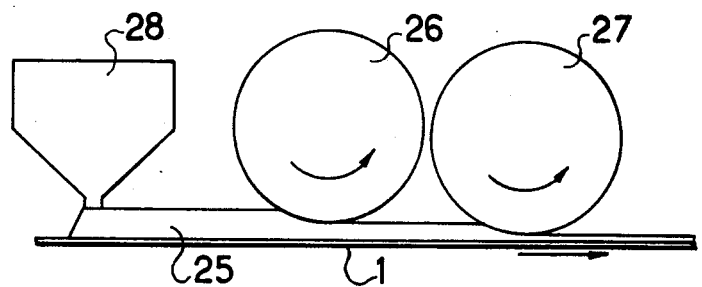
FIG. 5 is a schematic view of the device for mading the base layer of granules.

This toothed cylinder 16 is pressed on the belt 1 and is moved by the movement thereof. FIG. 1 shows that the binding agent 4, which is in the tank upstream of the distributor 5, can be admitted downstream only proportionally to the volume at the troughs of the teeth of the cylinder 16.

A second cylinder 17, similar to the first, is fixed nearby and "downstream" so that, by moving slightly, it meshes more or less in the teeth of the first cylinder 16.

In fact, it will be appreciated that, from the first few minutes, the binding agent, which remains stuck to the walls of the troughs of the first cylinder 16, begins to gel, and the teeth of the second cylinder 17, after suitable adjustments of its relative position with respect to the first cylinder 16, will fix the useful optimum volume of the troughs of the first cylinder 16.

The distributor 5 thus insures both the quantitative regularity of passage of the binding agent, from upstream to downstream, and also the calibration of the film 3 of the binding agent is allowed to continue its way on the moving belt 1.

Granules must now be rapidly introduced into the binding agent to make a strip of matter of homogeneous structure.

The granules have been cleaned, graded (from 1.5 mm to 10 mm), dried, mixed in experimentally favorable proportions and maintained at a temperature equal or very close to that adopted for the binding agent.

Figure 4:
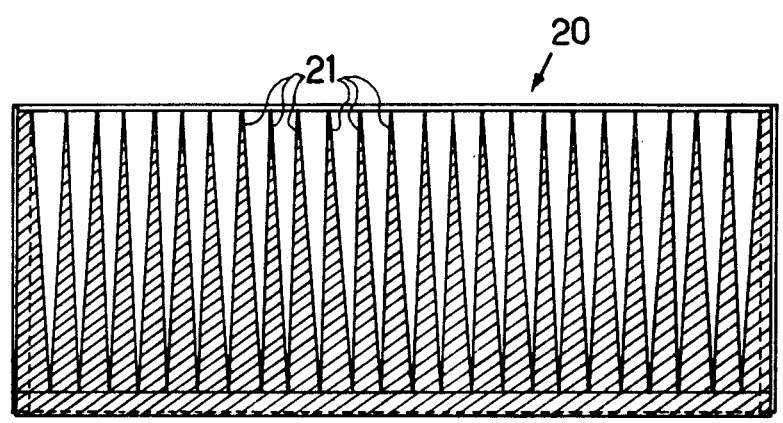
FIG. 4 is a plan view of the distributor with the nest of blades.
Figure 3:
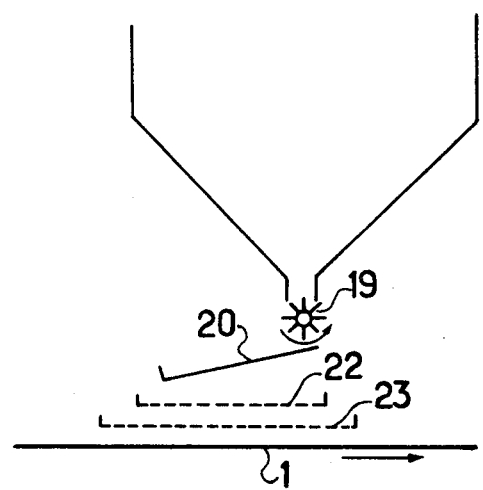
FIG. 3 is a schematic view of the dispenser-distributor.

On the moving belt 1, the film of binding agent passes beneath the granule distributor-dispenser 18 which projects the granules into the binding agent. The apparatus is composed of a dispenser 19 which is known in industry, but which, when combined with that of a granule distributor, forms part of the invention. The optimum quantities of granules are ejected from the distributor 19 and drop on the dispenser 20 which is essentially composed (cf. FIGS. 3 and 4) of a nest of metal blades 21 of decreasing cross-section and of two superposed sieves 22 and 23 located beneath the nest.

With respect to the speed of the belt 1, the thickness of the film 3 of the binding agent and its fluidity, the quantity of granules which are introduced into the binding agent is calculated so as to obtain a maximum aggregate/binding agent ratio.

All the granules are made to penetrate into the binding agent:

(1) by facilitating the sedimentation of the granules by previously coating them with a monomer (e.g. methyl methacrylate)

(2) by vibrating the belt by a high frequency vibration device, over a length of belt of 4 to 5 meters.

(3) by avoiding in the aggregates the presence of granules graded between 300 microns and 1.5 mm. In fact, if, on the one hand, the granules included in the range 1.5 mm and 10 mm have similar speeds of sedimentation, and if, on the other hand, the dust of 10 microns to 300 microns sediment little or not at all in the short lapse of time of the gel, on the other hand, in the range 300 microns to 1.5 mm, the speeds of sedimentation are very different and practically impossible to master; this zone of granulometry is therefore eliminated from the mixtures of aggregates.

(4) by vibrocompression of the granules, by means of rollers of variable pressure; this operation is effected after deposit, to saturation, on the strip of granules constituting the base of the plates.

The belt 1 continues to advance and receives the base granules 25, the latter dropping from the hopper 28, which adhere to the surface of the strip.

The strip passes now beneath the vibro-compressors 26, 27 and enters in a furnace 29. When it leaves the furnace, a suction device 30 recovers all the excess base granules, i.e. those which were not able to adhere to the strip.

The strip is now hard enough to be "stripped", i.e. removed from the belt 1, and then, by continuing its path on a roller table, it continues its polymerization,. It is then guillotined and cut into plates of large dimensions.

Both faces of these plates are polished by means of sets of grindstones, so as to eliminate the differences in surface structure, which differences result from the skin effect, as explained hereinabove.

The large plates undergo the finishing operations: polishing and are then sawn to the desired dimensions. It is interesting to note that the finishing does not include any stopping, as the surfaces do not exhibit any air bubbles after having been polished by the grindstone.

The cycle is terminated by the passage of the plates in an end-of-polymerization annealing furnace.

Thin, rigid, flat plates of less than 10 mm thickness are obtained by this method and this apparatus.

The invention also covers the use, as base constituents of plates as described above, of granules of expanded matter (e.g. expanded clay, expanded shale, etc.) as well as elastic materials in sheets or discontinuous elements or granulates, this in order to reduce the weight of the plates, improve their acoustic and thermal characteristics and facilitate laying thereof.

What is claimed is:

1. A method of manufacturing covering plates having a base of hard materials, granulated and pulverulent matter, respectively, agglomerated with synthetic resins, comprising the following successive operations
   coating a conveyor belt with a stripping agent,
   uniformly depositing on the conveyor belt a fine layer of binding agent of uniform thickness of accelerated catalyzed synthetic resin, containing hard pulverulent matter from 10 to 300 microns exclusively, and dyes, regularly and in graded manner by a binding agent distributor,
   sprinkling dried and clean granules of a size from 1.5 mm to 10 mm exclusively, mixed in favorable proportions, on the layer of binding agent, the sprinkling being effected by a doser distributor spreader,
   coating the granules prior to the sprinkling step with a wetting agent methyl methacrylate, the preceding operations being conducted by varying the speed of the belt, the thickness of the layer of binding agent, its fluidity, and the quantity of granules introduced into the binding agent so as to obtain an aggregate to binding agent weight ratio as high as possible,
   vibrating the following section of the conveyor belt, effecting a sedimentation of the granules until the level of the binding agent has risen above said granules, thereby effecting a complete integration and homogeneous distribution of the granules in the binding agent,
   covering the resulting strip with a base layer of granules which adhere on the upper surface of the strip,
   vibro-compressing the resulting strip with rollers,
   passing the resulting strip into a polymerization furnace,
   recovering excess granules by suction from the base layer of the resulting layer,
   removing the strip from the conveyor belt,
   guillotining and cutting the removed strip into plates of large dimensions,
   coarse polishing the faces of the plates on a grindstone,
   fine finishing the faces of the plates,
   sawing the plates to desired sizes, and
   passing the plates into a final furnace.

2. The method as set forth in claim 1, wherein
   the binding agent is prepared in two distinct portions which are combined only at the moment of use by preparing one of said distinct portions in a rotary cylinder by introducing therein at least a part of the resin, a maximum proportion of the pulverulent matter, a catalyst and dye in preselected quantities, and preparing the other distinct portion comprising the other part of the resin and an accelerator, respectively, and feeding, and combining, said two distinct portions simultaneously to the binding agent distributor, said binding agent being conveyed in small quantities varying as a function of the requirements of the binding agent distributor.

3. The method as set forth in claim 1, further comprising the step of
   heating the dried and clean granules which are deposited on the layer of binding agent.

4. The method as set forth in claim 3, wherein said dried and clean granules are heated to a temperature close to 100° C.

5. The method as set forth in claim 1, wherein
   said dried and clean granules have an absence of granules graded between 300 microns and 1.5 mm.

6. Thin covering plates constituting a product obtained by carrying out the method as set forth in claim 1, comprising
   a plate having a smooth, finished and polished surface, said plate comprising a fine layer of polymerized and solidified binding agent containing synthetic resin and at least hard pulverulent matter of approximately 200% of the weight of the resin, the pulverulent matter having the size of 10 to 300 microns,
   said plate including granules wetted with methyl methacrylate of a size exclusively from 1.5 mm to 10 mm, excluding sizes of 300 microns to 1.5 mm inserted throughout the binding agent,
   a base layer of coarse granules adhering to the other surface of the plate and embedded only a small amount into said binding agent, said other surface constituting a bottom surface of the plate adapted to be laid downwardly in use, said first mentioned surface being upward and visible in use, said coarse granules on said bottom surface being ground so as to define a planar surface adapted to be laid planar in use.

7. The product as defined in claim 6, wherein said coarse granules of the base layer constitute porous and light matter.

8. The product as defined in claim 6, wherein said coarse granules of the base layer constitute a layer of heat and sound-insulating material.

* * * * *